United States Patent [19]

Nield

[11] 3,742,087

[45] June 26, 1973

[54] THERMOPLASTIC BLENDS OF AROMATIC POLYSULFONES AND THERMOPLASTIC POLYESTERS

[75] Inventor: Eric Nield, Hertford, England

[73] Assignee: Imperial Chemical Industries Limited, London, England

[22] Filed: Sept. 15, 1970

[21] Appl. No.: 72,495

[30] Foreign Application Priority Data

Sept. 25, 1969 Great Britain.................. 47,261/69

[52] U.S. Cl................ 260/860, 260/40 R, 260/873
[51] Int. Cl............................................ C08g 39/10
[58] Field of Search...................... 260/860, 873, 40, 260/49

[56] References Cited
UNITED STATES PATENTS 3,640,944   2/1972   Seppala............................. 260/40

FOREIGN PATENTS OR APPLICATIONS 1,568,976   5/1969   France............................... 260/860
1,060,546   3/1967   Great Britain....................... 260/49
1,109,842   4/1968   Great Britain....................... 260/49

OTHER PUBLICATIONS

Chem. Abst. 66:95785j, "Thermoplastic - - - - Properties"; Union Carbide Corp.

Primary Examiner—William H. Short
Assistant Examiner—Edward Woodberry
Attorney—Cushman, Darby & Cushman

[57] ABSTRACT

Thermoplastic polymer blends which contain from 99.9 percent to 1 percent of one or more aromatic polysulphones and from 0.1 percent to 99 percent of one or more thermoplastic polyesters have a desirable combination of physical properties and in particular better flow properties in the melt than the polysulphones themselves.

17 Claims, No Drawings

THERMOPLASTIC BLENDS OF AROMATIC POLYSULFONES AND THERMOPLASTIC POLYESTERS

This invention relates to thermoplastic polymer blends, and in particular to blends which contain aromatic polysulphones and thermoplastic polyesters.

Aromatic polysulphones and methods of making them are described in British Pat. specification Nos. 1,016,245, 1,060,546, 1,078,234, 1,109,842, 1,122,192, 1,133,561, 1,153,035, 1,153,528 and 1,177,183 and U.S. Pat. No. 3,432,468, Netherlands Pat. specification No. 6,903,070 and German Pat. specification No. 1,938,806. They are generally thermoplastic materials of high softening point and considerable resistance to chemical degradation even at high temperatures. Owing to their high softening points, and their generally rather high melt viscosities at even higher temperatures, however, specially adapted equipment is often required for fabricating them into shaped articles by moulding or extruding from the melt.

It has now been found that aromatic polysulphones and thermoplastic polyesters form blends with a desirable combination of physical properties. This is a surprising discovery, because mixtures of different polymeric materials are usually mechanically weak. The aromatic polysulphone/polyester blends, on the other hand, are coherent and usually tough materials having better flow properties in the melt than the polysulphones themselves.

According to the invention, therefore, there are provided thermoplastic polymer blends which comprise from 99.9 to 1 percent of one or more aromatic polysulphones and from 0.1 to 99 percent of one or more thermoplastic polyesters, the proportions being by weight based on the total weight of thermoplastic polymeric material. Preferably the blends contain 1 percent or more of polyester.

The aromatic polysulphones described in the above-mentioned patent specifications comprise repeating units of the formula $$-Ar-SO_2-$$

in which Ar is a bivalent aromatic radical and may vary from unit to unit in the polymer chain (so as to form copolymers of various kinds). Thermoplastic polysulphones generally have at least some units of the structure

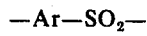

in which Z is oxygen or sulphur or the residue of an aromatic diol such as a 4,4′-bisphenol. One example of such a polysulphone has repeating units of the formula

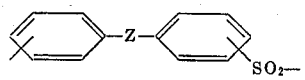

another has repeating units of the formula

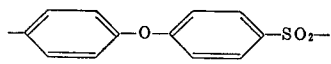

and others (which are commercially available in the United States of America) are said to have repeating units of the formula

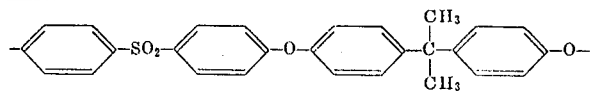

(Union Carbide Corporation) or copolymerised units in various proportions of the formulae

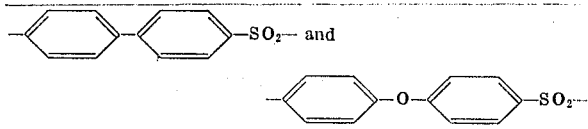

(Minnesota Mining and Manufacturing Company).

The polyesters with which the polysulphones may be blended are polymers formed by polycondensation between a hydroxy group on one molecule and a carboxylic or sulphonic acid group or an ester-forming derivative thereof (e.g., methyl ester or acid chloride) on another molecule. The monomers are conveniently glycols and di-acid derivatives, although monomers such as hydroxy-acids, lactones or sultones bearing a single hydroxy group (or its derivative) and a single ester-forming acid group may also be used, for example 4-hydroxymethylbenzoic acid and 4-2′-hydroxyethoxybenzoic acid.

Among the glycols whose residues may be in the polyesters are ethylene glycol (which may be supplied as a derivative such as ethylene oxide or carbonate) and the higher polymethylene glycols, e.g., butane-1,4-diol, branched chain glycols, e.g., neopentyl glycol (2,-2-dimethylpropane-1,3-diol), alicyclic glycols, e.g., 1,4-bis(hydroxymethyl) cyclohexane and 4,8-bis(hydroxymethyl)tricyclo[5.2.1.0$^{2,6}$] decane, and hetero-chain glycols, e.g., diethylene glycol.

Among the acids whose residues may be in the polyesters are aromatic dicarboxylic and disulphonic acids, e.g., terephthalic acid and phthalic acid and aliphatic acids e.g., adipic, azelaic and sebacic acids (hexane-1,6-, nonane-1,9- and decane-1,10-dioic acids respectively).

Examples of other aromatic dicarboxylic and disulphonic acids which may be used include isophthalic acid, biphenyl dicarboxylic and disulphonic acids, naphthalene dicarboxylic and disulphonic acids, and compounds containing two carboxyphenyl or sulphophenyl groups linked by a divalent bridging group which may for example, be alkylene, alkylene-dioxy, e.g., $-OCH_2CH_2O-$, $-O-$, $-S-$, $-SO_2-$ or $-CO-$.

Polyesters derived from aromatic hydroxy groups may also be used, for example a polyester having repeating units of the formula

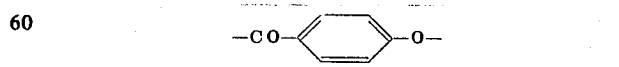

and polyesters derived from dihydric phenols (e.g., bis-(4-hydroxyphenyl) sulphone and bisphenol A) and aromatic dicarboxylic or disulphonic acids.

The polyesters may be copolymers containing mixed hydroxylic and/or ester-forming acidic groups, and

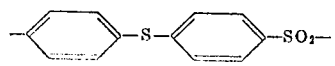

they may be block copolymers formed from different polyesters. A small amount of a chain-linking agent such as diphenyl carbonate may be present. The polyester-forming mixture may also contain up to about 5 mole percent of other mono- or poly-functional material, e.g., alcohols, amines, amino alcohols, aminoacids, lactams and diamines.

Polyethylene terephthalate is of great industrial importance as a fibre- and film-forming polyester, but its high degree of crystallinity has hindered its use as a thermoplastic moulding material. The crystallization properties are modified in its blends containing even quite small amounts of polysulphone, thus permitting these to be used more readily than untreated polyethylene terephthalate.

The blends of the invention are preferably made by mixing the molten polymers, for example by extrusion or in a sigma-bladed mixer or in a two-roll mill. The fact that coherent blends may easily be obtained by extrusion serves to distinguish them from mixtures of incompatible polymeric materials which cannot be blended in this way. Some of the polysulphones, however, have softening points so high that decomposition of the polyester might occur during melt blending, and the blends are then made by mixing the polymers in solution in a suitable solvent for both of them, e.g., nitrobenzene, benzonitrile, quinoline, phenol, cresol, dimethyl phthalate, or a thermally stable dipolar aprotic solvent.

The polysulphone/polyester blends of the invention may be mixed with particles of other polymeric materials as fillers having special properties, e.g., elastomeric materials and polytetrafluoroethylene. They may contain reinforcing fillers, for example glass, asbestos and carbon fibres, and other filler materials conferring various desired characteristics, e.g., solid lubricants (e.g., graphite or molybdenum disulphide), abrasives (e.g., carborundum), friction-conferring materials, magnetic materials (e.g., recording tapes), photosensitisers, and any other materials for which the blends of the invention make suitable vehicles. They may contain dyes and pigments, and an increased dyeability may be of advantage in fibres made from the blends.

The blends of the invention may be fabricated in any desired form, such as fibre, film and mouldings (e.g., injection mouldings) or extruded products of any desired shape. A nucleating filler may be a desirable additive for blends containing a high proportion of a crystalline polyester such as polyethylene terephthalate. Plasticisers (e.g., diphenyl sulphone) or other thermoplastic polymers (e.g., polythene) may also be added; they facilitate melt processing. The incorporation of particles of elastomeric material, especially of ethylene copolymers and ionomers, generally enables tougher articles to be made.

The blends of the invention have a low power factor and are good insulators. They are accordingly of use in numerous electrical applications including insulation of wire (e.g., as an adherent coating), slot-liners made from film of the blends, and capacitors containing the blends as dielectric material.

Blends containing more than 50 percent of polysulphone (by weight based on the total weight of thermoplastic material) generally retain high softening points but have lower melt viscosities than the untreated polysulphone. Such blends may for example be used for extruding hot water pipe. Blends containing up to 5 percent of polyester are of particular interest in that mechanical properties of polysulphone are largely retained while significant improvements of melt flow are obtained.

Blends containing more than 50 percent of polyester resemble the untreated polyesters in some respects but are characterised by a considerable improvement in certain mechanical properties such as Rockwell hardness, and often impact strength, even with 5 percent of polysulphone.

The mechanical properties of the blends of the invention depend to some extent on the molecular weight of the polysulphone and the polyester. When the polysulphone is the predominant component, it should have a molecular weight corresponding to a reduced viscosity of at least 0.35 and preferably at least 0.40. Polyesters of very low molecular weight (i.e., not fibre-forming materials) tend to act as polymeric plasticisers and hence are of value as processing aids for polysulphones, but polyesters of somewhat higher molecular weight are preferred for retention of mechanical properties such as rigidity in articles made from the blends. Polyesters of very high molecular weight may be desirable for ease of blending with the generally more viscous polysulphones. In any case, when the polyester is the predominant component it should be of high molecular weight.

The following examples illustrate the invention. Unless otherwise stated:

a. reduced viscosities of polysulphones were measured at 25°C on solutions in dimethyl formamide containing 1g of polymer in 100 cm$^3$ of solution;

b. intrinsic and reduced viscosities of polyesters were measured at 25°C on solutions in o-chlorophenol containing (for reduced viscosities) 0.5g of polymer in 100 cm$^3$ of solution;

c. melt viscosities were measured in a ram extruder at a shear rate of 1,000 s$^{-1}$;

d. impact strengths were measured as described at the end of Example 4.

EXAMPLE 1

A polysulphone consisting essentially of repeating units of the formula

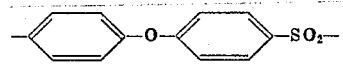

made by a process similar to that described in Example 3 of British specification No. 1,153,035 and having a reduced viscosity of 0.45 was blended with polyethylene terephthalate having an intrinsic viscosity of 0.65. The blend was made by mixing the molten polysulphone (64 g) and polyester (16 g) in a Brabender "Plasticorder" (Brabender, Duisburg am Rhein, Germany). The temperature of circulating oil in the heater of the "Plasticorder" was 286°C. Mixing was carried out at 100 revolutions/minute in the 55 cm$^3$ mixing head, allowing 10 minutes for mixing. The total weight of the mixture was 80g, and 0.25 percent of wax (Farbwerke Hoechst wax "PA 190") (0.5g) was added as a lubricant. Blends containing 80 percent of polysulphone and 20 percent of polyester were thus prepared, and blends containing 90 percent of polysulphone and 10 percent of polyester, prepared in similar fashion; each blend was a two-phase system and was readily compression-moulded. The inclusion of the polyester caused a fall in the melt viscosity of the blend, compared with the unblended polysulphone, amounting to a fall of about 30 percent in the melt viscosity for a blend containing 20 percent of polyester.

The impact strengths and Vicat softening points of the above blends and others of the same polymers in different proportions and prepared in similar fashion are tabulated below:

| Polysulphone weight % | Polyester weight % | Impact Strength kJ/m² | Vicat softening point °C | |
|---|---|---|---|---|
| | | | 1/10 | Full |
| 100 | 0 | 35.5 | 192 | 206 |
| 90 | 10 | 9.1 | 180 | 197 |
| 80 | 20 | 8.4 | 184 | 195 |
| 60 | 40 | | 192 | 210 |
| 40 | 60 | | 77 | 220 |
| 20 | 80 | | 83 | 233 |

EXAMPLE 2

Using the procedure described in Example 1, blends were similarly made from a polysulphone said to have repeating units of the formula

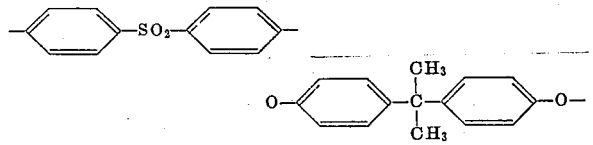

(Union Carbide Corporation "Polysulfone" P.1700) and polyethylene terephthalate of intrinsic viscosity 0.65. Blends containing 90 percent of polysulphone and 10 percent of polyester, and 80 percent of polysulphone and 20 percent of polyester, were prepared in this way; each blend was a two-phase system and was readily compression-moulded. The inclusion of the polyester caused a fall in the melt viscosity of the blend, compared with the unblended polysulphone, amounting to a fall of about 30 percent in the melt viscosity for a blend containing 20 percent of polyester.

The impact strengths and Vicat softening points of these blends are tabulated below:

| Polysulphone weight % | Polyester weight % | Impact Strength kJ/m² | Vicat softening point °C | |
|---|---|---|---|---|
| | | | 1/10 | Full |
| 100 | 0 | 84 | 181 | 188 |
| 90 | 10 | 27 | 169 | 182 |
| 80 | 20 | 8 | 154 | 184 |

EXAMPLE 3

Blends similar to those of Examples 1 and 2 respectively were prepared from each of the polysulphone materials and 10 percent and 20 percent by weight of polyethylene terephthalate by melting them together in an extruder. The ease of blending and the good dispersion obtained of small amounts of polyethylene terephthalate with the polysulphones in this way was remarkable.

EXAMPLE 4

Using the procedure described in Example 1, a polysulphone as described in Example 1 was blended with a number of different polyesters, each blend containing 80 percent by weight of polysulphone and 20 percent by weight of polyester. The blends were readily compression-moulded and had melt viscosities at least 25 percent lower than that of the unblended polysulphone. In many cases the impact strength and softening point were not very different from those of the unblended polysulphone, as shown in the following table. The reduced viscosities of the polyesters (measured on a solution in o-chlorophenol containing 1g of polymer in 100 cm³ of solution) are shown in parentheses.

| Polyester Component | Impact Strength kJ/m² | Vicat Softening point °C | |
|---|---|---|---|
| | | 1/10 | Full |
| none | 12 | 207 | 214 |
| polyethylene sebacate (0.57) | 10 | 205 | 212 |
| polyethylene 2,6-naphthalate | 6 | 203 | 210 |
| polyethylene diphenoxyethane-4,4'-dicarboxylate (0.98) | 6 | 194 | 203 |
| polytetramethylene terephthalate (1.05) | 10 | 202 | 208 |
| polycyclohexane-1,4-dimethyl terephthalate (0.71) | 2 | 210 | 219 |
| polyethylene terephthalate/polyethylene phthalate 85/15 copolymer (0.66) | 7 | 191 | 196 |
| polyethylene terephthalate/polyethylene sebacate 70/30 copolymer (0.90) | 5 | 185 | 192 |
| polyethylene terephthalate/polyethylene 2,6-naphthalate 85/15 block copolymer (0.79) | 6 | 193 | 201 |
| polyethylene terephthalate/polyethylene 1,3,3-trimethyl-1-phenylindane-6,4'-dicarboxylate 85/15 block copolymer (0.77) | 6 | 191 | 198 |
| polyethylene terephthalate/polytricyclo [5.2.1.0²,⁶]decane- 4,8-dimethyl terephthalate 85/15 copolymer (0.63) | 6 | 190 | 198 |
| polyethylene terephthalate/poly-2,2-dimethyltrimethylene diphenyl sulphone 4,4'-dicarboxylate 10/40 copolymer (0.59) | 2 | 209 | 215 |

In the test of impact strength, a specimen 60 mm long, 6.5 mm wide and 3 mm thick was given a 45° notch 2.8 mm deep (tip radius 2.0 mm) in the centre of one edge. The notched specimen was supported between two supports 50 mm apart and struck centrally on the edge opposite the notch by a pendulum dropping from 300 mm with more than sufficient energy to break the specimen. From the residual energy of the pendulum the energy required to break the specimen was calculated and divided by the cross-sectional area of the specimen at the notch. The resulting value (expressed in kJ/m²) represents the energy required to break the material.

EXAMPLE 5

Blends were prepared by melt extrusion to contain a polyester as the major component and a polysulphone as the minor component. The polyesters were two injection-mouldable grades of polyethylene terephthalate modified to give substantially amorphous mouldings and obtained commercially as "Arnite" A200 and "Arnite" G700 (AKU and Glanzstoff respectively). "Arnite" A200 is polyethylene terephthalate of high purity and free from nucleating agents; "Arnite" G700 is polyethylene terephthalate containing a minor proportion of polythene. The polysulphones were those used in Examples 1 and 2, i.e., a polysulphone consisting essentially of repeating units of the formula

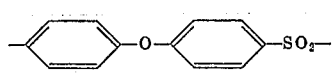

(polysulphone I) and the Union Carbide "Polysulfone" (U.C. polysulfone) respectively. The impact strength and Rockwell Hardness (according to ASTM D 785) of these blends are tabulated below.

| Polyester | Polysulphone amount in blend | Notched specimen impact strength | Rockwell Hardness |
|---|---|---|---|
| Arnite A 200 | 0 | 48 kJ/m$^2$ | M 29 |
| | polysulphone I | | |
| | 10% | 29 | M 37 |
| | 20% | 9 | M 45 |
| | U C polysulfone | | |
| | 10% | 28 | |
| | 20% | 28 | |
| Arnite G 700 | 0 | 7 | M 15 |
| | polysulphone I | | |
| | 10% | 27 | M 20 |
| | 20% | 34 | M 27 |
| | UC polysulfone | | |
| | 10% | 35 | |
| | 20% | 24 | |

EXAMPLE 6

Polyesters were prepared by interfacial polycondensation of (a) isophthaloyl chloride with bis-(4-hydroxyphenyl) sulphone and (b) isophthaloyl chloride with 2,2-bis-(4-hydroxyphenyl)propane and had reduced viscosities of (a) 0.30 and (b) 0.41 respectively, (measured at 25°C on a solution in o-chlorophenol containing 0.5 g of polymer in 100 cm$^3$ of solution).

Blends of these polyesters with a polysulphone as described in Example 1 (reduced viscosity 0.44) were prepared by extrusion of the mixed powders in a 16 mm extruder, at 100 revolutions per minute with a barrel temperature of 330°C and a die temperature of 350°C. The polysulphone alone and the blend obtained from 180 g of polysulphone and 20 g of polyester (a) gave transparent extruded lace and transparent compression mouldings; the blend obtained from 153 g of polysulphone and 17 g of polyester (b) gave hazy samples.

Compression mouldings were made from the extruded blends at 330°C under 20.3 tonnes in 127 mm × 76.2 mm × 3.18 mm plaques.

The impact strength of the mouldings and the melt viscosities of the blends are tabulated below.

| Material | Impact Strength kJ/m$^2$ | Melt viscosity at 350°C Ns/m$^2$ |
|---|---|---|
| Unblended polysulphone | 19.95 | 465 |
| Blend with polyester (a) | 19.09 | 365 |
| Blend with polyester (b) | 19.45 | 320 |

EXAMPLE 7

A sulphone copolymer was prepared in the following manner.

A solution in dimethyl sulphoxide (300 cm$^3$) of the potassium salt of 4-(4-chlorophenylsulphonyl)phenol, (117 g; 0.433 mole; prepared in a manner similar to that described in Example 10 of British specification No. 1,153,035), a polyaryl sulphone having repeating units of the structure

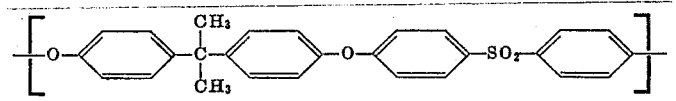

(21.2 g; 0.048 mole calculated on the repeating unit; Union Carbide Corporation "Polysulfone" P 1700) and 1,1-dioxothiolan (200 cm$^3$) were charged to a round-bottom flask fitted with a stirrer, a vacuum still head and a dry nitrogen inlet. Dimethyl sulphoxide was distilled at 78°–82°C under reduced pressure (20 torr) and then the temperature of the boiling mixture was allowed to rise to 130°C whilst about 100 cm$^3$ of 1,1-dioxothiolan distilled at 20 torr. The pressure of the flask was returned to atmospheric pressure by the admission of nitrogen and the reaction mixture was then stirred at 220°C for 18 hours under a stream of dry nitrogen. The viscous reaction products were diluted with dimethyl formamide until freely fluid and the resulting solution was cooled and then dripped into stirred methanol. The copolymer which precipitated was collected, extracted with hot methanol and dried in vacuo. The copolymer had reduced viscosity 0.37 and was composed of units of the structures

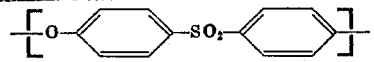

and

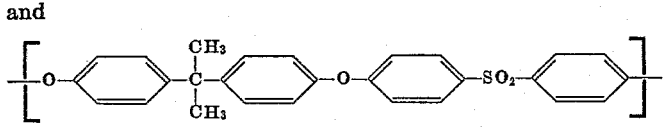

in the molar ratio of the starting materials, i.e., approximately 90 percent molar of the former and 10 percent molar of the latter.

An ester copolymer of low molecular weight was prepared by the reaction of di(hydroxyethyl) terephthalate and succinic anhydride in molar ratio 1:0.85. It had a reduced viscosity of 0.25 (measured on a solution in chloroform containing 0.5 g of polymer in 100 cm$^3$ of solution).

Blends of the two copolymers containing 10 percent and 20 percent of the polyester respectively were prepared by mixing solutions of each at 20 percent by weight in nitrobenzene. The clear mixed solutions were poured into methanol and the precipitated polymer blends were washed well with methanol and then dried in vacuum at 110°C. The impact strengths of compression-moulded samples and the melt viscosities are tabulated below.

| Material | Impact Strength kJ/m$^2$ | Melt viscosity at 350°C Ns/m$^2$ |
|---|---|---|
| Unblended sulphone copolymer | 25.2 | 267 |
| Blend with 10% of ester copolymer | 14.7 | 52 |
| Blend with 20% of ester copolymer | 8.2 | * |

*(too low to measure at 350°C)

EXAMPLE 8

A blend of Union Carbide "Polysulfone" P1700 and polyethylene terephthalate (intrinsic viscosity 0.66 in o-chlorophenol at 25°C) was prepared by mixing 1200 g of the polysulphone and 300 g of the polyester in a Vickers "Transfermix" extruder having a 25.4 mm four-start screw and stator (i.e., barrel) and a 1.6 mm die at 320°C and 120 revolutions per minute. The resulting extruded lace was cut and dried at about 120°C and then injection-moulded into discs 114 mm in diameter and 3.2 mm thick. Specimens for impact test were cut (a) along the direction of flow and (b) across the direction of flow and the test results were (a) 25.2 kJ/m² and (b) 16.0 kJ/m² respectively. The melt viscosity of the blend was too low to measure at 350°C and 1,000 s⁻¹; under these conditions the melt viscosity of unblended "Polysulfone" P1700 was 236 Ns/m².

EXAMPLE 9

A blend containing 99 percent by weight of a polysulphone as described in Example 1 (reduced viscosity 0.44) and 1 percent by weight of a polyester having repeating units in equal proportions of the formulae

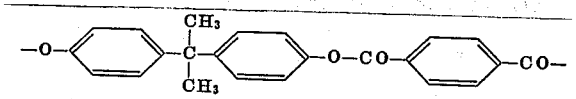

and

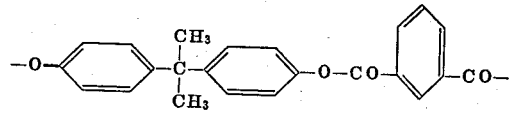

and of very low molecular weight (reduced viscosity 0.14) was prepared on a 19 mm extruder at 40 revolutions per minute with temperatures along the barrel ranging from 290°C to 312°C to 330°–335°C at the die. The resulting extruded lace was cut up and then dried and compression-moulded into 128 mm × 76 mm × 3.2 mm plaques at 330°C under 20 tonnes for 5 minutes. The impact strength and melt viscosity (measured as described in Examples 1 and 6) are tabulated below in comparison with those of the unblended polysulphone.

| Material | Impact Strength kJ/m² | Melt viscosity at 350°C Ns/m² |
|---|---|---|
| Unblended polysulphone | 22.7 | 465 |
| 1% polyester blend | 36.3 | 410 |

EXAMPLE 10

A polysulphone having units of the formulae

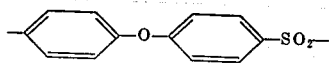

(80 mole percent) and

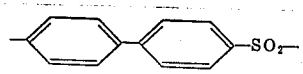

(20 mole percent) and a reduced viscosity of 0.45 was prepared in a manner similar to that described in Example 2 of British specification 1,153,528 from di-(4-chlorophenyl)sulphone (60 mole percent) and 4,4'-bis-(4-chlorophenylsulphonyl)biphenyl (40 mole percent). This polysulphone (95 g) was melt-blended with a polyester (5 g) having repeating units of the formula

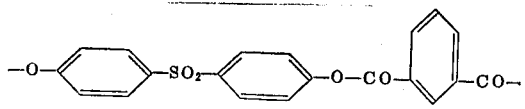

and a reduced viscosity of 0.28. The blending was carried out in a Vickers "Transfermix" extruder having a 25.4 mm single-start screw and stator (barrel) and a 3.2 mm die at 350°C (Barrel and die) and 60 revolutions per minute. The transparent extruded lace was compression-moulded at 350°C under 20.3 tonnes for 5 minutes, and the impact strength and melt viscosity are tabulated below in comparison with those of similarly treated unblended sulphone copolymer.

| Material | Impact Strength kJ/m² | Melt viscosity at 350°C Ns/m² |
|---|---|---|
| Unblended sulphone copolymer | 21 | 970 |
| Blend with 5% polyester | 13 | 660 |

EXAMPLE 11

A polysulphonate having repeating units of the formula

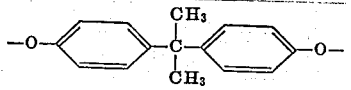

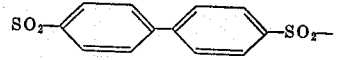

made as described by W.R. Sorenson & T.W. Campbell in "Preparative Methods of Polymer Chemistry." Second Edition 1968 (Interscience Publishers, New York) from biphenyl -4,4'-disulphonyl chloride and 2,2-di-(4-hydroxyphenyl) propane by interfacial polycondensation (using sodium lauryl sulphate as the detergent) and having a reduced viscosity of 1.0 could be blended in an amount of 5 g with 95 g of Union Carbide "Polysulfone" P1700, using a Vickers "Transfermix" under the conditions described in Example 10, to give a material having an improved balance of mechanical properties compared with those of the unblended polysulphone.

EXAMPLE 12

A polysulphonate having repeating units of the formula

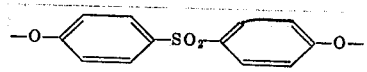

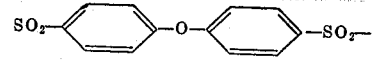

made as described in Example 11 from diphenyl ether 4,4'-disulphonyl chloride and di-(4-hydroxyphenyl) sulphone and having a reduced viscosity of 1.0 could be blended in an amount of 5 g with 95 g of a polysulphone having repeating units of the formula

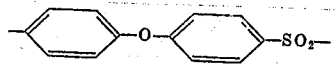

(reduced viscosity 0.45) as described in Example 1, using a Vickers "Transfermix" under the conditions described in Example 10, to give a material having an improved balance of mechanical properties compared with those of the unblended polysulphone.

EXAMPLE 13

Blends were made using a Vickers "Transfermix" under the conditions described in Example 10, of a polysulphone as described in Example 1 (reduced viscosity 0.45) and a number of different samples of polyethylene terephthalate. Samples of the blends were injection-moulded on a Stubbe machine at 330°C into a mould at 90°C to give discs 114 mm in diameter and 3.2 mm thick. Samples for impact testing were cut from the discs across the direction of flow. The results of impact strength and melt viscosity are tabulated below.

| Material (% by weight of polyester) | Impact Strength kJ/m² | Melt viscosity at 350°C Ns/m² |
|---|---|---|
| Unblended polysulphone | 55.6 | 460 |
| 1% Arnite A 200 |  | 440 |
| 5% Arnite A 200 | 31.1 | 270 |
| 5% (intrinsic viscosity 0.65) | 28.4 | 250 |
| 5% (intrinsic viscosity 0.83) | 23.1 | 310 |
| 5% Arnite G 700 | 32.1 | 260 |

(The intrinsic viscosities of the polyethylene terephthalate samples were measured at 25°C in o-chlorophenol).

These results indicate that 2 to 4 percent by weight is probably the optimum amount of a polyester for blending into a polysulphone to give two-phase blends of easy melt processability but reasonably high impact strength.

I claim:

1. A thermoplastic polymer blend of improved melt flow properties which comprises from 99.9 to 1 percent of one or more thermoplastic aromatic polysulphones having a molecular weight, when the pre dominant component, corresponding to a reduced viscosity of at least 0.35 measured in dimethyl formamide at 25°C and consisting essentially of repeating units of the formula —ArSo₂— where Ar is a bivalent aromatic radical which may vary from unit to unit and any oxygen and/or sulfur linking atoms in the polymer chain being bonded to aromatic carbon atoms and from 0.1 to 99 percent of one or more thermoplastic polyesters formed by condensation of at least one of the group (a) aliphatic or aromatic hydroxy carboxylic or sulphonic acids, (b) substantially equimolar mixture of at least one aliphatic diol or bisphenol and at least one aliphatic or aromatic dicarboxylic or disulphonic acid or (c) ester forming derivative thereof, the proportions being by weight based on the total weight of thermoplastic polymeric material.

2. A blend according to claim 1 which contains a polysulphone having at least some repeating units of the structure

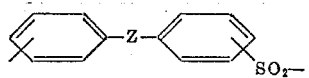

where Z is oxygen or sulphur or the residue of an aromatic diol.

3. A blend according to claim 1 which contains a polysulphone having repeating units of the formula

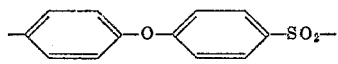

4. A blend according to claim 1 which contains a polysulfone having repeating units of the formula

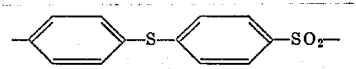

5. A blend according to claim 1 which contains a polysulphone having repeating units of the formula

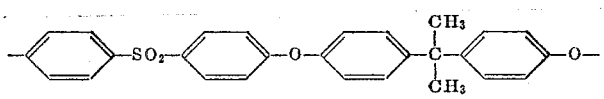

6. A blend according to claim 1 which contains a polysulphone having units of the formulae

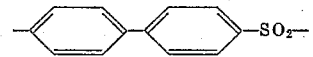

and

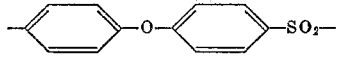

7. A blend according to claim 1 which contains a polyester of one or more dicarboxylic acids of benzene, naphthalene and biphenyl.

8. A blend according to claim 1 which contains a polyester of one or more members of the group consisting of aromatic disulphonic acids of benzene, naphthalene and biphenyl.

9. A blend according to claim 1 which contains a polyester of a glycol containing two to 14 carbon atoms.

10. A blend according to claim 1 which contains a polyester of a dihydric phenol selected from the group consisting of bis-(4-hydroxyphenyl) sulfone and bisphenol A.

11. A blend according to claim 1 which contains at least 1 percent by weight of polyester.

12. A blend according to claim 1 which contains not more than 40 percent by weight of polyester.

13. A blend according to claim 1 which contains from 1 to 5 percent by weight of polyester.

14. A blend according to claim 1 which contains a filler.

15. A blend as claimed in claim 1 in the form of fibre.

16. A blend as claimed in claim 1 in the form of film.

17. A blend as claimed in claim 1 in the form of an injection moulding.

* * * * *